United States Patent [19]

Lebby et al.

[11] Patent Number: 5,225,816
[45] Date of Patent: Jul. 6, 1993

[54] ELECTRICAL CONNECTOR WITH DISPLAY

[75] Inventors: Michael S. Lebby, Chandler; Karen E. Jachimowicz, Goodyear, both of Ariz.

[73] Assignee: Motorola, Inc., Schaumburg, Ill.

[21] Appl. No.: 743,628

[22] Filed: Aug. 12, 1991

[51] Int. Cl.$^5$ .............................................. G08B 21/00
[52] U.S. Cl. .................................. 340/653; 340/540; 340/654; 340/657; 439/488; 439/489
[58] Field of Search ................ 340/653, 654, 657, 540; 439/488, 489

[56] References Cited

U.S. PATENT DOCUMENTS 4,155,082  5/1979  Jones et al. ........................ 340/656
5,101,152  3/1992  Harwood et al. ................... 340/653

Primary Examiner—Glen R. Swann, III
Attorney, Agent, or Firm—Eugene A. Parsons

[57] ABSTRACT

An electrical connector with visual display connecting an information bus to a computer in an information processing system including electronics mounted within a connector body and coupled to the information bus, the electronics monitoring information flowing through the information bus and providing output signals in response thereto and visual display circuitry mounted in the connector body and connected to receive the output signals from the electronics and provide a visual display in response thereto indicating the flow of information through the bus.

7 Claims, 1 Drawing Sheet

ELECTRICAL CONNECTOR WITH DISPLAY

The present invention pertains to electrical connectors for information buses including data and/or power leads

BACKGROUND OF THE INVENTION

Electrical connectors are utilized to couple power and/or data to or from virtually all electrical and electronic equipment. Electrical connectors are especially useful in connecting multi-conductor information leads, hereinafter referred to as information buses, to other buses or to electronic components.

In relatively complicated electronic systems, and especially information systems including one or more computers, it is imperative that the connectors be correctly mated to other connectors and that the information buses are conveying the desired data and/or power. In these complicated electronic systems, an improperly mated connector or a bus having a broken lead can render the entire system inoperative or, worse, inaccurate. Because these systems are extremely expensive, down time is a great waste of valuable time. Also, maintenance can be time consuming and costly.

SUMMARY OF THE INVENTION

It is an object of the present invention to provide a new and improved electrical connector.

It is a further object of the present invention to provide an electrical connector which instantly apprises an operator as to the condition of the connector and attached information bus.

These and other objects are realized in an electrical connector with visual display connecting an information bus to an electrical component, the electrical connector including a connector body, electronics mounted within the connector body and coupled to the information bus, the electronics monitoring information flowing through the information bus and providing output signals in response thereto, and visual display circuitry mounted in the connector body and connected to receive the output signals from the electronics and provide a visual display in response thereto indicating the flow of information through the bus.

BRIEF DESCRIPTION OF THE DRAWINGS

Referring to the drawings

DESCRIPTION OF THE PREFERRED EMBODIMENT

Figure 1:
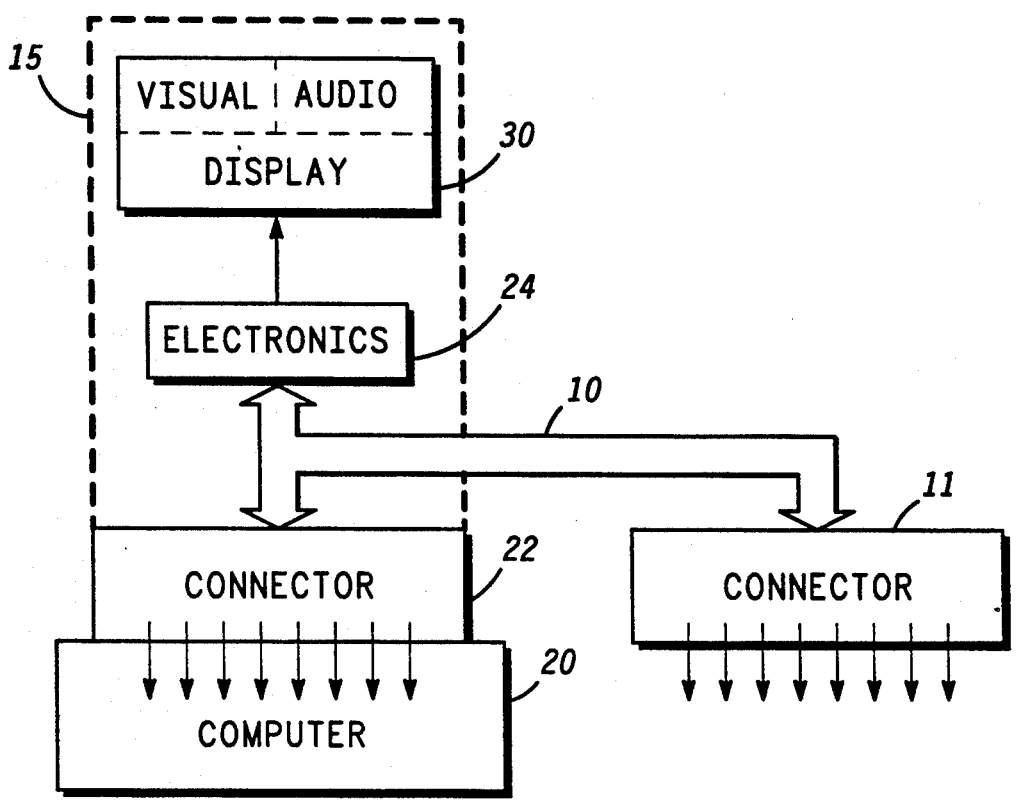
FIG. 1 is a simplified block diagram of an electrical connector embodying the present invention.

Referring specifically to FIG. 1, a multi-lead information bus 10 is illustrated having an electrical connector 11 at one end and an electrical connector with visual and audio display 15 at the other end. Bus 10 is utilized to carry data and/or power, hereinafter referred to as information, between electronic components such as components included in computer systems, telecommunications switch/exchange environment, etc. In this specific embodiment bus 10 has electrical connector 15 only at the end connected to a computer 20 but it will be understood that the position of electrical connectors 11 and 15 could be exchanged or, if desired, connectors similar to electrical connector 15 are included at both ends.

Electrical connector 15 includes a connector portion 22 electrically and physically connected to one end of each of the leads in bus 10, in a normal and well known manner. Further attached to each of the leads in bus 10 is electronics 24. Electronics 24 receives operating power from one or more of the leads in bus 10, which one or more leads may be normal leads carrying power to computer 20 or special leads included in bus 10 only to carry power to electronics 24. In special applications, power can be supplied to connector 15 by a self-contained battery, which is a substantial advantage for maintenance work and work in the field. Also, while electronics 24 is coupled to each of the leads in bus 10 for purposes of monitoring each of the leads, it will be understood that in some applications it may only be necessary to monitor one or more leads to provide a complete indication as to the operation of bus 10 and electrical connector 15.

In this embodiment electronics 24 is a microprocessor including at least the usual basic components: input/output units; a memory; control units; and an arithmetic and logic unit (ALU). The microprocessor is either preprogrammed to sense specific information, or events, in bus 10 and raise flags if the information and/or events do not occur, or the microprocessor is programmed from computer 20 as the application and or function of computer 20 changes. This type of microprocessor programming can be programmed into computer 20 or could be introduced by an operator through the computer keyboard. It will of course be understood that, in a simplified form, electronics 24 is a hardwired (preprogrammed) logic circuit that senses continuity of each lead, or crucial leads, by, for example, sensing current flowing in the lead. The logic circuitry is, for example, CMOS or BICMOS and is generally formed on a single integrated chip for convenience and to reduce power consumption. Many other types of circuits and components may also be used, such as ECL and group III and V semiconductor electronics for very high speed operation.

Electronics 24 supplies one or more output signals to display circuitry 30. In this specific embodiment, display circuitry 30 is a low power LCD but it will be understood that the display may incorporate LEDs, lasers, FEDs, or any convenient light source. It is of course desirable that electronics 24 and display circuitry 30 incorporate a high impedance input, such as FETs or the like , and utilize very little signal power so that electrical connector 15 appears to have virtually the same effect on information passing through bus 10 as electrical connector 11.

In this preferred embodiment the microprocessor in electronics 24 has pre-selected messages stored therein, which are conveyed to display circuitry 30 during operation of electrical connector 15. Whenever electrical connector 15 is operating correctly the following message appears on display circuitry 30: "information correct, operation normal." Other pre-selected messages stored in the memory of the microcomputer are: "lead 1 (or 2—N) not functioning."; "signal voltage too low."; "information order incorrect."; etc. As an alternative, each error that can potentially be sensed by electronics 24 may be given a predetermined number and display circuitry 30 simply displays the number corresponding to the error sensed. In addition to the visual display provided by display circuitry 30, an audible warning is also provided so that errors in information transmission are quickly and efficiently located. It will of course be understood that the audible warning is optional and may be eliminated in some very large and complicated systems utilizing full time maintenance.

In some applications additional memory, such as SRAMs, DRAMs, ROMs, etc., can be utilized in conjunction with display circuitry 30. For example, the messages may be in alpha-numeric form or, in special instances, pictorial messages may be stored, which pictorial messages illustrate the operation and maintenance required. In some applications the basic connector provides a simple indication, visual or audible, of errors and further includes accessible terminals for electrical probing or for connecting a more complex, external indicator. In this embodiment, the connector indicates the error has occurred and a maintenance person connects a more complicated indicator to electronics 24 which provides a visual and/or audible indication of the exact problem and a suggested solution.

Figure 2:
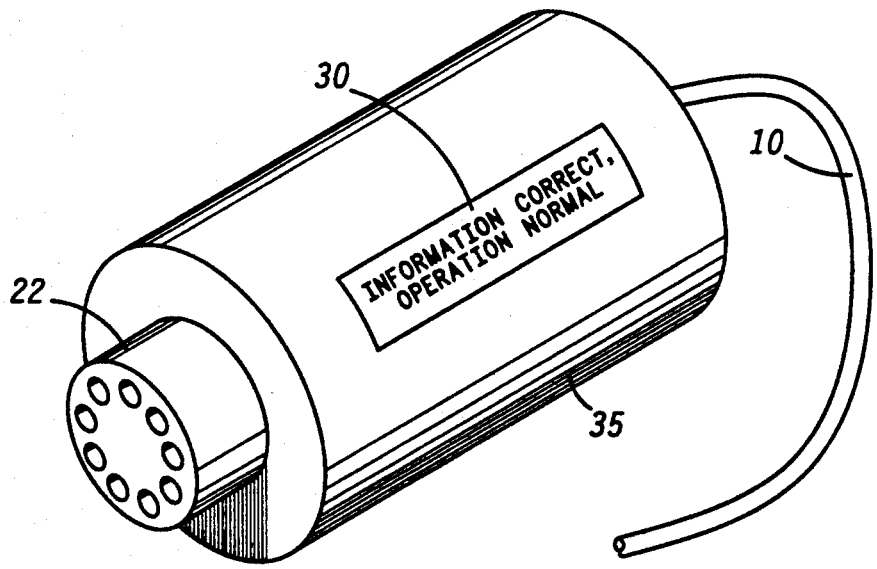
FIG. 2 is a view in perspective of the connector of FIG. 1.

Referring specifically to FIG. 2, electrical connector 15 is constructed in the form of a tubular sleeve 35 surrounding and operating as a hand-hold for connector portion 22. In this embodiment bus 10 is introduced into electrical connector 15 at one end of tubular sleeve 35 and connector portion 22 protrudes from the opposite end sufficiently to easily engage a mating portion. Tubular sleeve 35 surrounds and is fixedly engaged with connector portion 22, in this specific embodiment being formed as a single integral unit. Tubular sleeve 35 houses visual display circuitry 30 and provides the visual display at a convenient outwardly directed portion of the major surface thereof. It will of course be understood that, depending upon the extent of messages being displayed and the size of comparable non-display connectors 11, tubular sleeve 35 adds very little bulk to connector portion 22, and may, in some instances, be the same size and shape.

Thus, a new and improved electrical connector for use with a multilead bus is disclosed which provides a visual display of the operation. Because of the visual display and, optionally, audible display, the maintenance and downtime of electronic components, such as computer systems, is substantially reduced. Further, the electrical connector is constructed to utilize the bus leads for power and to have virtually no effect on information flowing in the bus. Also, the physical construction of the electrical connector is such that the size and shape of the connector portion is changed only slightly while providing easy access to visually observe messages displayed by the connector.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. An electrical connector with visual display comprising:
    a connector formed to be electrically attached to one end of an electrical bus, the bus being adapted to convey information to the connector;
    electronics mounted within the connector and monitoring information flowing through the connector, the electronics providing output signal sin response to the information flowing through the connector;
    visual display circuitry mounted in the connector and connected to receive the output signals from the electronics and provide a visual display in response thereto indicating the flow of information through the connector; and
    the connector including a tubular sleeve having a major surface and first and second ends, the sleeve being formed with the bus ingress at the first end, electrical connections at the second end and the display in the major surface.

2. A electrical connector with visual display comprising:
    an electrical information bus containing a plurality of leads;
    a connector electrically attached to one end of the electrical information bus, the bus being adapted to convey information to the connector, the connector having a connector body;
    electronics mounted within the connector body and coupled to the information bus to monitor information flow through the connector, the electronics providing output signals in response to the information flowing through the connector; and
    visual display circuitry mounted within the connector body and connected to receive the output signals from the electronics and provide a visual display in response thereto indicating, for each lead of the plurality of leads, the flow of information through the connector.

3. An electrical connector with visual display as claimed in claim 2 wherein the electronics includes hard-wired CMOS logic.

4. An electrical connector with visual display as claimed in claim 2 wherein the visual display is an LCD.

5. An electrical connector with visual display as claimed in claim 2 wherein the electronics includes a memory with prestored messages therein.

6. In an electronic information processing system, an electrical connector with visual display connecting an information bus to an electronic component in the information processing system comprising:
    an electronic component;
    an information bus containing a plurality of leads; and
    an electrical connector connecting the information bus to the electronic component including
        a connector body,
        electronics mounted within the connector body and coupled to the information bus, the electronics monitoring information flowing through the information bus and providing output signals in response thereto, and
        visual display circuitry mounted in the connector body and connected to receive the output signals from the electronics and provide a visual display in response thereto indicating, for each lead of the plurality of leads, the flow of information through the bus.

7. In an electronic information processing system, an electrical connector with visual display connecting an information bus to an electronic component in the information processing system as claimed in claim 6 wherein the electronic component is a computer.

* * * * *